2,998,326
CLEANING AND SIZING OF FABRICS

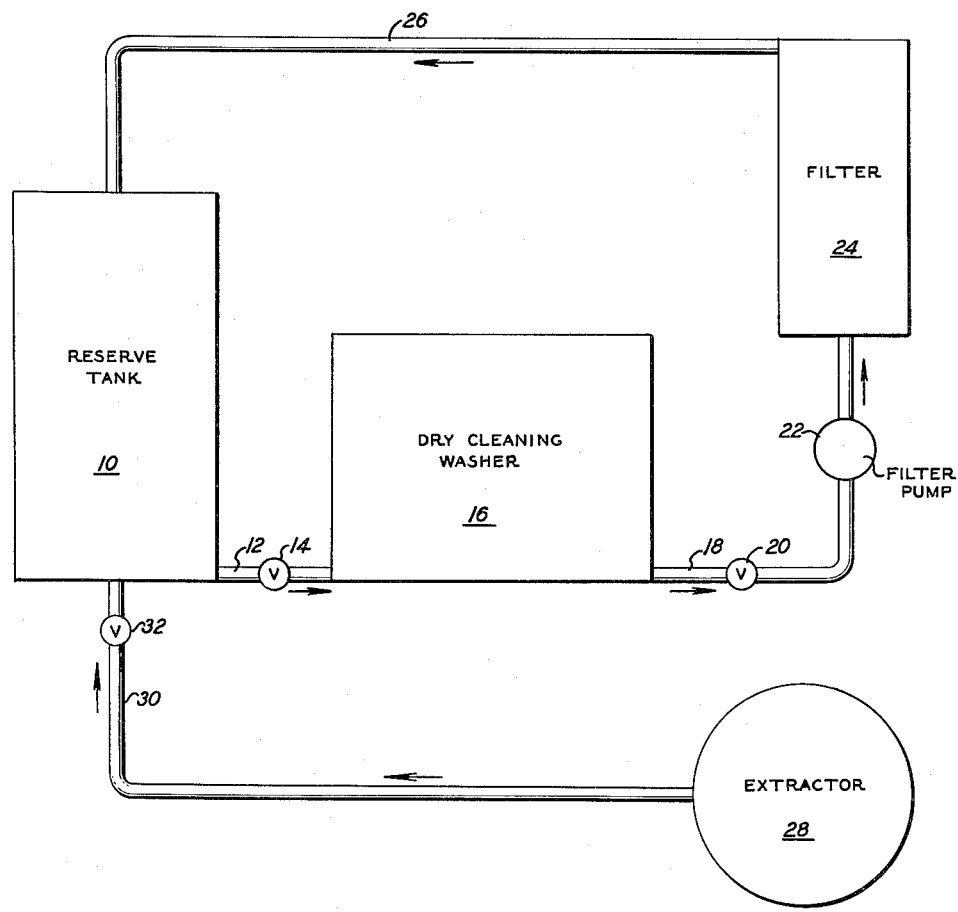

Herbert A. Ellenbogen, Great Neck, and Emre Bleier, New York, N.Y., and Jules Sirota, South Plainfield, N.J., assignors, by direct and mesne assignments, of one-half to National Starch Products Inc., New York, N.Y., a corporation of Delaware, and one-half to Herbert A. Ellenbogen, New York, N.Y.
Filed Apr. 4, 1956, Ser. No. 576,085
6 Claims. (Cl. 117—66)

This invention relates to an improved dry cleaning process and to an improved process of sizing of fabrics, usually finished as garments, preferably as a part of or adjunct to a dry cleaning process, and to compositions adapted to effect dry cleaning or a sizing of the garment, as an adjunct to dry cleaning.

The sizing of fabrics is ordinarily desirable to impart improved properties to the fabrics, such as, handweight, wrinkle resistance, water repellancy and a bright new appearance. Most dry cleaning procedures involve washing of the garment with a dry cleaning solvent, but in all an essential characteristic is that the solvent must be recovered and purified, such as by continuous pressure filtration through a filter. Such filter is usually coated with filter aid, such as diatomaceous earth, which removes the suspended solids, the partially dissolved and some of the dissolved impurities in the solvent.

Sizing of garments as heretofore practiced in the art involved impregnating the fabric comprising the garment with a resinous material. This was usually a cheap resin of the character of a natural resin, such as rosin, as distinguished from a flexible resin of synthetic character. There have been two disadvantages to that type of fabric sizing. Such natural resins are brittle and tend unduly to harshen the fabric and thereby reduce the desirable hand. In use and normal wear of the fabric, such resin tended to crumble and powder so that the resin impregnated into the fabric produces an undesirable dull color and lose its "new look" and resistance to wrinkling and rumpling, etc. Most synthetic resins could not be used with a dry cleaning solvent, because they are absorbed by the filter and were lost thereon, while interfering with the ordinary filtration of the solvent.

According to the present invention, we have found that if a specific type of flexible synthetic resin is used which has at least 5% solubility in the dry cleaning solvent, the garment cleaned with such resin containing solvent will have, upon subsequent drying, a desired sizing effect. Moreover, that dry-cleaning-solvent-solubie type of flexible synthetic resin will not be removed by the filter so that the solvent may be continuously cleaned and regenerated in a pressure type filter, as in a normal cleaning operation, whereby sizing of the garment can be economically effected with the garment cleaning process.

The resins used in our invention are not only soluble, but preferably are copolymerized resins which, by selection of copolymer substances have imparted an enhanced solubility in the dry cleaning solvent as well as a high degree of flexibility. Additional plasticizers for our resin are not necessary to produce a high flexibility. Since it is dry-cleaning-solvent-soluble, it will not be removed from the dry cleaning solution upon subsequent filtration and solvent regeneration procedure other than by evaporation. We have found that an outstanding type of copolymer resin, for dry cleaning and sizing purposes, is one wherein after its use in the dry cleaning process the garment will retain a requisite quantity of the resin to impart the desired sizing properties and, furthermore, wherein after evaporation of the solvent, these sizing properties will be further reinforced by the moderate amount of heat that is ordinarily associated with the subsequent pressing operation when the garment is finished to wearable form.

For accomplishment of these purposes, our resin preferably is a copolymer of vinyl acetate with a higher aliphatic ester of which either the alcohol or acid radical is alpha-beta unsaturated. Such esters are typically esters of a higher saturated aliphatic monohydric alcohol having from 8 to 17 carbon atoms with an alpha-beta unsaturated polymerizable carboxylic acid of mono- or polybasic type, such as acrylic acid, methacrylic acid, maleic acid, or fumaric acid. Alternatively, the second comonomer may be an ester whose alcohol component is a polymerizable alcohol consisting of a polymerizable unsaturated lower monohydric aliphatic alcohol having 2-4 carbon atoms, such as, vinyl alchol, methallyl alcohol, divinyl carbinol, methyl vinyl carbinol, and the like, esterfied with a higher saturated mono or dibasic acid having from 8 to 17 carbon atoms.

Thus, our preferred resin is a copolymer of two monomers selected, as follows:
(A) Vinyl acetate.
(B) An ester having the following formula XRCOOR' wherein either R or R', but not both, is an unsaturated lower alkenyl radical having from 2 to 4 carbon atoms, and the unsaturation preferably occurs alpha-beta with respect to the carboxyl, and the other R or R', whichever is saturated, will have from 8 to 17 carbon atoms; and X is selected from the group consisting of hydrogen and R'OOC—.

According to this formula where R is an alpha-beta unsaturated acid, it may be, typically, acrylic, methacrylic, maleic or fumaric acids, and R' will be octyl, nonyl, decyl, undecyl, dodecyl, lauryl, myristyl, or stearyl alcohols, and the like, including branched chain isomers, like diisobutyl, tetrapropylene, etc. Where R is saturated, RCOO may be octanoyl, nonanoyl, decanoyl, stearyl, and the like, and R' will be vinyl or the radical of one of the lower unsaturated alcohols listed above. Examples of monomers of this formula are vinyl octoate, vinyl stearate, octyl acrylate, lauryl methacrylate, dioctyl maleate, dimyristyl fumarate, stearyl acrylate, dioctyl fumarate, and the like.

In forming of the resin of this invention, the vinyl acetate monomer is copolymerized with from 30 to 50 mol. percent of a monomer of the above formula to a molecular weight exceeding about 10,000. It may be polymerized to a higher molecular weight, but in any case, the molecular weight should not be so high that the solubility of the copolymer in the dry cleaning solvent is substantially less than 5%. The copolymerization of the vinyl acetate with the monomer of the above formula tends to impart integral plasticization and flexibility to the copolymer. A preferred group of copolymers are vinyl acetate copolymerized with about 44 mol. percent of dioctyl maleate, or dioctyl fumarate. In selecting a suitably soluble resin, Stoddard solvent as a typical dry cleaning solvent, may be used as a basis for determining that solubility, since, if the resin has adequate solubility therein, that is at least 5% in Stoddard solvent, it would inherently also be soluble in other typical dry cleaning solvents which are sometimes used, such as perchloro-ethylene.

Although the resins may be obtained in solid form, as for example, by bulk polymerization, we find it preferable and more convenient to prepare them as concentrated solutions in dry cleaning solvents by means of solution polymerization techniques well known to those in the art. Thus, for example, 48 parts by weight of a mixture of vinyl acetate and dioctyl maleate, in such relative proportions that the dioctyl maleate amounts to 44 mol. percent and the vinyl acetate 56 mol. percent of the total monomers, are dissolved in 8.5 parts ethyl acetate, with the addition of 1 percent benzoyl peroxide based on the monomers. The mixture is heated at reflux for about 4 hours. Twenty-three parts Stoddard solvent are then added, resulting in a resin solution of approximately 60 percent solids. The benzoyl peroxide is, of course, a polymerization catalyst and other catalysts may be used.

These resins will not precipitate or cloud out of the solvent and are not filtered out when the solvent is cleaned by passing through an absorptive type filter, such as diatomaceous earth, typically used in the dry cleaning solvent purification.

In use of the resin in our process, it is desirable for even and rapid penetration of the resin into the fiber to incorporate a small quantity of a surface active compound usually from about 0.05% to 1%. Such surface active agent may be an alkyl aryl sulfonate, petroleum sulfonate soaps, sodium lauryl sulfate typically anionically active wetting agents; or alkyl phenoxy polyalkylene oxide alkanols, such as ditertiary butyl phenoxy triethylene oxide ethanol typical of non-ionic surface active agents. The resin may be mixed with the detergent and the mixture added to the dry cleaning solvent in the cleaning vat or, as preferred, the resin, which may be mixed with the wetting agent, is handled as a concentrated homogeneous solution in Stoddard solvent, and ultimately added to the dry cleaning solvent as needed, in the required quantity for sizing.

A useful size imparting concentration of resin dissolved in dry cleaning solvent such as Stoddard solvent or perchlorethylene is preferably from about 0.01% to 0.5% by weight of the solvent. Larger quantities may be used, but if the quantities are too large, there may be a tendency to stiffen the fabric unduly; a certain amount of such stiffening may sometimes be preferred, and for such purpose quantities up to 1 percent or even more may be used, as desired. Moreover, lesser quantities give decreased sizing effect, although some sizing effect is evidenced in concentrations as low as 0.005 weight percent of the solvent.

There are several dry cleaning and sizing procedures that are useful, and the sizing agent hereof will generally be used in modification of whatever dry cleaning process is being used in the particular dry cleaning plant. Thus, the fabric after solvent dip may simply be sprayed with sufficient solution of the size in the dry cleaning solvent to effect a further empirical impregnation or substantial wetting. The garment may also be dipped in the solution and then hung to dry. However, usual dry cleaning procedures require more than simple spraying or dipping and it is preferred even when the garment is first partially cleaned, to apply the size a subsequent wash or rinse including the usual agitation. The procedure preferred is, as follows:

The garment is placed in a washer, such as, a typical dry cleaning washer, and agitated with dry cleaning solvent containing homogeneously dissolved therein the sizing material and, after beating in the washer for a usual time, 10 to 15 minutes, the solvent solution of the size is pumped through a filter for removing impurities and returned to a storage tank. The solvent solution wet garment may have its excess solution extracted in the washing device; or the garment may be transferred to an extractor from which excess solvent solution is removed and returned to the storage chamber for solution, and the damp garment is then dried. Upon drying by evaporation of the solvent, the size contained therein becomes permanently fixed in the fiber. Thereafter, the garment is pressed as usual with steam to final shape, that steam pressing supplying sufficient heat to further reinforce and set the sizing quantity of resin in the fiber.

Apparatus for effecting such usual and simplified dry cleaning operation is illustrated in the single attached figure in the drawing which illustrates diagrammatically a dry cleaning system. As an example of operating such system, a dry resin mix, such as a dry copolymer of vinyl acetate and 44 mol. percent of dioctyl maleate containing 0.5 weight percent of sodium lauryl sulfate is dissolved in Stoddard solvent to give a total concentration of resin solids therein of 0.02 weight percent. The homogeneous solution is placed in reserve tank 10 from which it is passed by way of pipe 12 controlled by valve 14 to a standard dry cleaning washer 16 filled to a level sufficient to completely immerse garments placed therein to be cleaned. The garments are agitated in the solvent-size solution for a period of 10 to 15 minutes and the solution is then pumped out of the washer 16 through pipe 18 controlled by valve 20 by pump 22 and forced through filter 24. The dirt and grease with which the used garments may have been coated or soiled become dissolved in the solvent and the dilute size solution in the solvent simultaneously homogeneously impregnates the garment. The grease and some suspended solids contained in the solvent passed through filter 24 become removed by a filter aid, such as diatomaceous earth with which the filter is coated, and the solvent becomes relatively pure, but still contains substantially the same quantity of size resin and wetting agent originally contained therein. The solvent solution is returned from the filter to the reserve tank 10 by way of pipe 26. After the excess solvent solution has been pumped from the washer 16, it may be refilled again in a second washing, which operates as a rinse, by passing more solution containing size into the washer 16 from the reserve tank 10. In a final step, the wet garments are placed in an extractor 28 which centrifugally or by tumbling removes excess solvent and size forcing the solution through pipe 30 controlled by a valve 32 back to the reserve tank 10. The garments now damp dried may be further tumbled for further drying by passing air through the extractor or may be hung to dry according to conventional dry cleaning procedures. The garment is then finally steam pressed to final form.

There are many dry cleaning modifications of the method just described which will operate. For example, two reserve tanks 10 may be used, one of which contains ordinary dry cleaning solvent and the other of which contains a solvent solution of size. The garment then is first washed with dry cleaning solvent which contains no size and after removing and filtering that solution from the garment, a second dry cleaning solution containing size is then added to the washer as a rinse.

The following examples illustrate several formulations for the dry cleaning solution containing size:

*Example 1*

Forty-eight parts by weight of a mixture of vinyl acetate monomer and dioctyl maleate in the relative proportions 44 mol. percent dioctyl maleate and 56 mol. percent vinyl acetate, were dissolved in 8.5 parts ethyl acetate, together with 1 percent, based on the monomers, of benzoyl peroxide, and the mixture heated for approximately 4 hours at reflux. The resulting copolymer (which was, of course, in solution form) had a molecular weight substantially above 10,000 and a solubility of at least 10 percent in Stoddard solvent. To this solution there was then added ½ percent of sodium lauryl sulfate, based on the resin weight and sufficient Stoddard solvent was added to form a solution containing .03 weight percent of dissolved solids. That solution was used as a dry cleaning solution for men's woolen suitings according to the procedure and in the apparatus above described. After washing for 15 minutes and tumbling in a rinse solution for 5 additional minutes, the size solution was extracted. The damp suiting was dried in warm air and then pressed with steam. The garment was found to have substantially improved resistance to rumpling and wrinkling, with excellent "hand." There was no harshness and the appearance of the fabric was bright as a new garment.

Example 2

Example 1 was repeated except that in place of the dioctyl maleate we used didecyl fumarate to form the copolymer with the vinyl acetate. Similarly good results were obtained when this resin was used in the above-described cleaning-sizing process.

Example 3

A copolymer obtained by the bulk copolymerization of 50 mol. percent of vinyl acetate and 50 mol. percent octyl acrylate was mixed with 1 percent alkyl aryl sulfonate detergent and dissolved as a concentrate in a Stoddard solvent, such that a half gallon of this concentrate could subsequently be diluted by mixing with 20 gallons of Stoddard solvent for use in the cleaning-sizing operation previously described. Results comparable to those obtained in Example 1 were noted.

Example 4

Example 3 was repeated using a copolymer of 50 mol. percent vinyl acetate and 50 mol. percent vinyl stearate. Comparable results were obtained.

Example 5

In an alternate procedure, the garments were first cleaned with ordinary solvent in a washer as described above. The solvent was withdrawn from the washer and extracted from the garment in the usual way. The garments were then replaced in the washer and it was filled with the same sizing solution from the reservoir tank as described in Example 1. The washer then was run for 4 minutes with the sizing solution, and the sizing solution was pumped through the filter back to a solvent-size solution reservoir tank. The garments were then extracted and tumbled substantially dry in air and finally hung individually to dry.

As thus described, various garments may be cleaned and sized by adding the size to the cleaning solution or to the rinse solution after cleaning, using cleaning solvent such as Stoddard solvent or other dry cleaning solvents, such as perchlorethylene as a solvent for the sizing resin. Upon evaporation of the cleaning solvent containing size, the garment is both cleaned and sized. Various fabrics may be treated with the solution to impart a sized, store-new effect, and the quantity of size imparted to the fabric will the concentration of resin dissolved in the solvent within the range given above. The sizing composition may be a resin which is added as a dry resin to the solvent, or as a dry resin mixed with a detergent, or the resin with or without the detergent may be made up as a concentrate in the solvent and the concentrated solution is thereafter diluted with more solvent to final fabric treating concentration.

Various modifications known to those skilled in the art may be applied to the dry cleaning procedures described herein, and it is intended that the description and examples herein given be illustrative and not limiting except as defined in the claims appended hereto.

What we claim is:

1. Process of dry cleaning and sizing of fabrics comprising applying to the fabric an 0.001 to 0.5 weight percent dry cleaning solvent solution of a copolymer of vinyl acetate and from 30 to 50 mol percent of a polymerizable monomer consisting of an aliphatic ester in which one of the aliphatic radicals of said ester is an alkenyl radical having 2 to 4 carbon atoms and the other aliphatic radical is saturated and contains 8 to 17 carbon atoms, said copolymer having at least 5% solubility in Stoddard solvent, and allowing the solvent retained by said fabrics to evaporate thereby producing a clean fabric sized with said copolymer.

2. Process of dry cleaning and sizing of fabrics comprising washing the fabric with an 0.001 to 0.5 weight percent dry cleaning solvent solution of a resin copolymer of vinyl acetate with from 30 to 50 mol percent of a monomer selected from the group consisting of an 8 to 17 carbon atom alkyl ester of an alpha-beta unsaturated monobasic carboxylic acid having 2–4 carbon atoms attached to the carboxyl carbon an 8 to 17 carbon atom alkyl ester of an alpha-beta unsaturated dibasic carboxylic acid and a 2–4 carbon atom alkenyl ester of an aliphatic carboxylic acid having from 8 to 17 carbon atoms, said copolymer having at least 5% solubility in Stoddard solvent, and allowing the solvent retained by said fabrics to evaporate thereby producing a clean fabric sized with said copolymer.

3. A process of dry cleaning and sizing of fabrics comprising washing the fabric with an 0.001 to 0.5 weight percent dry cleaning solvent solution of a resin copolymer of about 44 mol percent vinyl acetate and about 56 mol percent dioctyl maleate, said copolymer having at least 5% solubility in Stoddard solvent, and allowing the solvent retained by said fabrics to evaporate thereby producing a clean fabric sized with said copolymer.

4. Process of dry cleaning and sizing of fabrics and improving the recovery of solvent used in such process comprising applying to the fabric an 0.001 to 0.5 weight percent dry cleaning solvent solution of a copolymer of vinyl acetate and from 30 to 50 mol percent of a polymerizable monomer consisting of an aliphatic ester in which one of the aliphatic radicals of said ester is an alkenyl radical having 2 to 4 carbon atoms and the other aliphatic radical is saturated and contains 8 to 17 carbon atoms, said copolymer having at least 5% solubility in Stoddard solvent; removing the excess contaminated solvent solution from the fabric; filtering said excess contaminated solvent solution; maintaining at least 0.001 to 0.5 weight percent of said copolymer in the filtered solvent solution by adding any necessary copolymer; and allowing the solvent solution retained by said fabrics to evaporate thereby producing a cleaned fabric sized with said copolymer.

5. Process of dry cleaning and sizing of fabrics and improving the recovery of solvent used in such process comprising washing the fabric with an 0.001 to 0.5 weight percent dry cleaning solvent solution of a resin copolymer of vinyl acetate with from 30 to 50 mol percent of a monomer selected from the group consisting of an 8 to 17 carbon atom alkyl ester of an alpha-beta unsaturated monobasic carboxylic acid having 2 to 4 carbon atoms attached to the carboxyl carbon, an 8–17 carbon atom alkyl ester of an alpha-beta unsaturated dibasic carboxylic acid and a 2–4 carbon atom alkenyl ester of an aliphatic carboxylic acid having from 8 to 17 carbon atoms, said copolymer having at least 5% solubility in Stoddard solvent; removing the excess contaminated solvent solution from the fabric; filtering said excess contaminated solvent solution; maintaining at least 0.001 to 0.5 weight percent of said copolymer in the filtered solvent solution by adding any necessary copolymer; and allowing the solvent solution retained by said fabrics to evaporate thereby producing a cleaned fabric sized with said copolymer.

6. Process of dry cleaning and sizing of fabrics and improving the recovery of solvent used in such process comprising washing the fabric with an 0.001 to 0.5 weight percent dry cleaning solvent solution of a resin copolymer of about 44 mol percent vinyl acetate and about 56 mol percent dioctyl maleate, said copolymer having at least 5% solubility in Stoddard solvent; removing the excess contaminated solvent solution from the fabric; filtering said excess contaminated solvent solution; maintaining at least 0.001 to 0.5 weight percent of said copolymer in the filtered solvent solution by adding any necessary copolymer; and allowing the solvent solution retained by said fabrics to evaporate thereby producing a cleaned fabric sized with said copolymer.

(References on following page)

References Cited in the file of this patent

UNITED STATES PATENTS

| | | |
|---|---|---|
| 1,990,691 | Hatfield | Feb. 12, 1935 |
| 2,160,375 | Voss et al. | May 30, 1939 |
| 2,168,535 | Nuesslein et al. | Aug. 8, 1939 |
| 2,430,564 | Gordon | Nov. 11, 1947 |
| 2,536,050 | Fluck | Jan. 2, 1951 |
| 2,540,311 | Wolff | Feb. 6, 1951 |
| 2,628,198 | Arundale et al. | Feb. 10, 1953 |
| 2,712,683 | Gaunt et al. | July 12, 1955 |
| 2,729,576 | Trusler | Jan. 3, 1956 |
| 2,774,689 | Orthner et al. | Dec. 18, 1956 |
| 2,776,909 | Fleck | Jan. 8, 1957 |

OTHER REFERENCES

Schildknecht: "Vinyl and Related Polymers," pages 365–369, Wiley, 1952.